(12) United States Patent
Veeramani et al.

(10) Patent No.: US 10,397,645 B2
(45) Date of Patent: Aug. 27, 2019

(54) REAL TIME CLOSED CAPTIONING OR HIGHLIGHTING METHOD AND APPARATUS

(71) Applicant: Intel Corporation, Santa Clara, CA (US)

(72) Inventors: Karthik Veeramani, Hillsboro, OR (US); Rajneesh Chowdhury, Portland, OR (US); Mark A. Gray, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/467,406

(22) Filed: Mar. 23, 2017

(65) Prior Publication Data

US 2018/0277142 A1 Sep. 27, 2018

(51) Int. Cl.

| | | |
|---|---|---|
| *G10L 21/10* | (2013.01) | |
| *G10L 15/08* | (2006.01) | |
| *H04N 21/439* | (2011.01) | |
| *G10L 15/00* | (2013.01) | |
| *G06F 17/28* | (2006.01) | |
| *H04N 21/488* | (2011.01) | |

(Continued)

(52) U.S. Cl.
CPC ....... *H04N 21/4394* (2013.01); *G06F 17/289* (2013.01); *G10L 15/005* (2013.01); *G10L 15/26* (2013.01); *G10L 25/57* (2013.01); *H04N 21/42203* (2013.01); *H04N 21/4884* (2013.01); *H04N 21/84* (2013.01); *G10L 17/00* (2013.01); *G10L 2015/088* (2013.01)

(58) Field of Classification Search
CPC .... G06F 17/289; G06F 3/0481; G06F 17/214; G10L 15/005; G10L 15/26; G10L 2015/088; G10L 15/08; G10L 17/00; G10L 17/005; G10L 21/028; G10L 21/10; G10L 25/57; H04N 21/4394; H04N 21/4884; H04N 21/42203; H04N 21/84
See application file for complete search history.

(56) References Cited

U.S. PATENT DOCUMENTS

| | | | |
|---|---|---|---|
| 9,654,736 B2 * | 5/2017 | Shanks | .............. H04N 7/17309 |
| 2003/0065503 A1 * | 4/2003 | Agnihotri | ........... G06F 17/2705 704/7 |

(Continued)

*Primary Examiner* — Angela A Armstrong
(74) *Attorney, Agent, or Firm* — Schwabe, Williamson & Wyatt, P.C.

(57) ABSTRACT

Apparatuses, methods and storage medium associated with real time closed captioning or highlighting are disclosed herein. In embodiments, an apparatus may include an audio interceptor to intercept an audio portion of an audio/video output stream of a multi-media application; a speech recognizer coupled to the audio interceptor to, in real time, process the audio portion of the audio/video stream, recognize speech within the audio portion, and automatically generate text corresponding to recognized speech, or keywords within the recognized speech; and a controller coupled to the audio interceptor and the speech recognizer, to control operations of the audio interceptor and the speech recognizer. The automatically generated text or keywords may be outputted as closed captions or highlights to complement video content of the audio/video stream. Other embodiments may be disclosed or claimed.

22 Claims, 8 Drawing Sheets

(51) Int. Cl.
  *G10L 15/26* (2006.01)
  *G10L 25/57* (2013.01)
  *H04N 21/422* (2011.01)
  *H04N 21/84* (2011.01)
  *G10L 17/00* (2013.01)

(56) References Cited

U.S. PATENT DOCUMENTS

| | | | |
|---|---|---|---|
| 2005/0228676 A1* | 10/2005 | Ifukube | H04N 5/278 704/275 |
| 2009/0249222 A1* | 10/2009 | Schmidt | H04N 21/2368 715/751 |
| 2013/0195422 A1* | 8/2013 | Patil | H04N 21/23424 386/239 |
| 2013/0268598 A1* | 10/2013 | Tipirneni | G06F 3/011 709/204 |
| 2014/0088961 A1* | 3/2014 | Woodward | G10L 15/22 704/235 |
| 2015/0100981 A1* | 4/2015 | Gao | H04N 21/435 725/32 |
| 2016/0066055 A1* | 3/2016 | Nir | G10L 15/05 725/35 |

* cited by examiner

Non-transitory computer-readable storage medium
802

Programming Instructions 804
configured to cause a device, in response to execution of the programming instructions, to implement selected elements of Figures 1-2, and/or practice (aspects of) the method of Figures 3-6.

Figure 8

REAL TIME CLOSED CAPTIONING OR HIGHLIGHTING METHOD AND APPARATUS

TECHNICAL FIELD

The present disclosure relates to the field of computing, in particular, to apparatuses, methods and storage medium associated with real time closed captioning or highlighting for multi-media content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Audio/video consumption on computing devices has become one of the most common usages today. Device manufacturers strive to make the experience better, usually by focusing on improving quality and adding support for newer codec. However, content is created in multiple languages which prove a barrier for universal consumption. Some content providers embed closed caption in multiple languages for increasing the audience, but such content with embedded language closed-captioning relies on the supplier to deliver. When resources are constrained, the number of languages supported may be limited or nonexistent. For a truly universal audience, audio/visual content should break away from the language barrier.

Increasingly, users also use voice over Internet Protocol (VoIP) phone solutions, like Skype, on computing devices to virtually attend meetings. As a result, it becomes easier for more meetings to be scheduled, especially in a global connected environment where users are encouraged to converge and collaborate. An unfortunate side effect is that it becomes more difficult to determine which meetings required attendance, but having VoIP calling means that it is not necessary to make that choice. In theory, any user may call into multiple meetings via VoIP and make one "active" while others are on hold. However, it might be a problem if the topic changes unexpectedly and the meeting organizer calls on an attendee who put the meeting on hold. Attendees need a way to rejoin an on-hold meeting at an appropriate time, and participate effectively.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 illustrates an example storage medium with instructions to enable a computing device to practice the present disclosure, in accordance with various embodiments.

DETAILED DESCRIPTION

Figure 1:
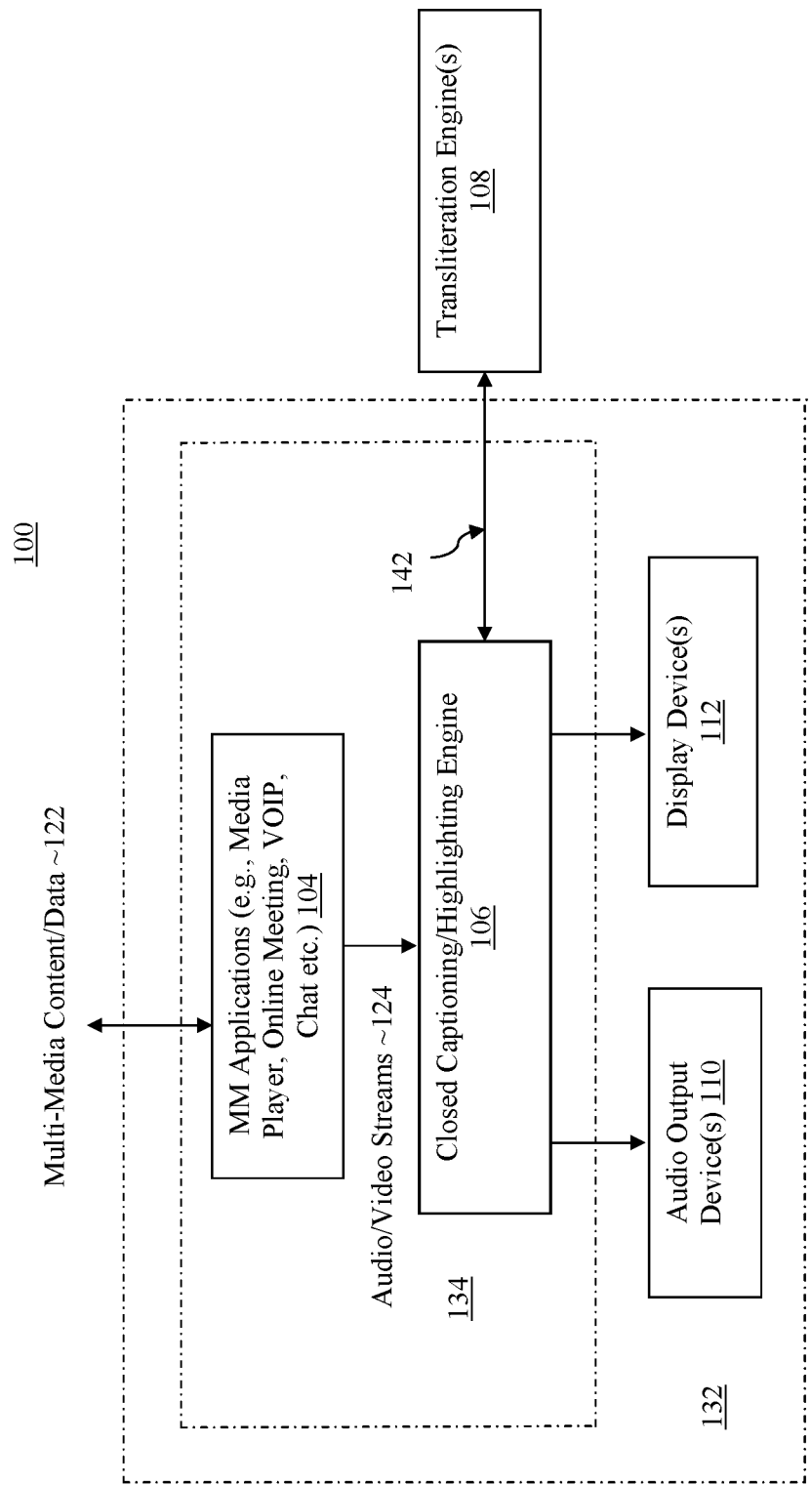
FIG. 1 illustrates an overview of a system with the closed captioning or highlighting engine of the present disclosure and an optional transliteration engine, in accordance with various embodiments.

Apparatuses, methods and storage medium associated with real time closed captioning or highlighting are disclosed herein. In embodiments, an apparatus for providing multi-media content may include an audio interceptor to intercept an audio portion of an audio/video output stream of a multi-media application; a speech recognizer coupled to the audio interceptor to, in real time, process the audio portion of the audio/video stream, recognize speech within the audio portion, and automatically generate text corresponding to recognized speech, or keywords within the recognized speech; and a controller coupled to the audio interceptor and the speech recognizer, to control operations of the audio interceptor and the speech recognizer. The automatically generated text or keywords may be outputted as closed captions or highlights to complement video content of the audio/video stream.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs generated from a plurality of programming instructions, a combinational logic circuit, and/or other suitable components that provide the described functionality.

Referring now FIG. 1, wherein an overview of a system with the closed captioning or highlighting engine of the present disclosure, in accordance with various embodiments, is shown. As illustrated, in embodiments, computing system 100 for providing multi-media content may include one or more multi-media applications 104, closed captioning or highlighting engine 106, transliteration engine(s) 108, audio output device(s) 110 and display device(s) 112, coupled with each other. Multi-media applications 104 may receive multi-media content/data 122 and output audio/video streams 124. In some embodiments, multi-media applications 104 may output audio/video streams 124 on its own, without necessarily receiving multi-media content/data 122. Closed captioning or highlighting engine 106, when enables (e.g., under user control), may intercept audio/video streams 124, and process audio/video streams 124 in real time to provide automatic closed captioning or highlighting to complement the video content of audio/video streams 124, to be described more fully below. In embodiments, closed captioning or highlighting engine 106 may optionally cooperate with transliteration engines 126 to provide automatic closed captioning or highlighting service in a different language other than the original language of the speech in the audio/video stream 124.

Each multi-media application 104 may be any one of a number of multi-media applications known in the art. Examples of multi-media applications 104 may include, but are not limited to, media players playing media content received wirelessly, via cable, or from a medium, online meeting applications, VOIP applications, chat applications, and so forth. Similarly, each audio output device 110 and/or display device 112 may be any one of a number of such audio/video output devices known in the art. Examples of audio output devices 110 may include, but are not limited to, audio ports, wireless speakers, headsets, ear pieces, and so forth. Examples of audio output devices 110 may include, but are not limited to, video ports, active matrix displays, touch screen displays, and so forth. Each transliteration engine 124 may be configured to transliterate between two or more languages, e.g., English, French, Italian, Chinese, Japanese, Korean, and so forth. Likewise, transliteration engines 126 may be any one of such elements known in the art. An example of a transliteration engine 126 may include, but are not limited to, the Transliteration Utility (TU) available from Microsoft Corporation of Redmond, Wash.

In embodiments, an apparatus, e.g., a desktop computer, may include all the elements 104-112 of system 100. In other embodiments, an apparatus 132, e.g., a laptop, a tablet, or a smartphone may include all the elements 104-112 of system 100, with the exception of transliteration engines 108, which may be disposed in a peer device, a remote server of a local area network or in the cloud. For these embodiments, closed captioning or highlighting engine 106 may communicate with transliteration engines 108 over communication link(s) 142, which may be wired or wireless communication links over a local and/or wide area network (including the Internet). In still other embodiments, an apparatus 134, e.g., a computing platform or core, may include only elements 104 and 106. Audio output devices 110 and/or display devices 112 may be local or remote from the computing platform. In embodiments, remote display devices 112 may coupled to the computing platform through display technologies such as Miracast or WiDi. These are merely non-limiting illustrations of various possible arrangements of elements 104-112 of system 100.

Figure 2:
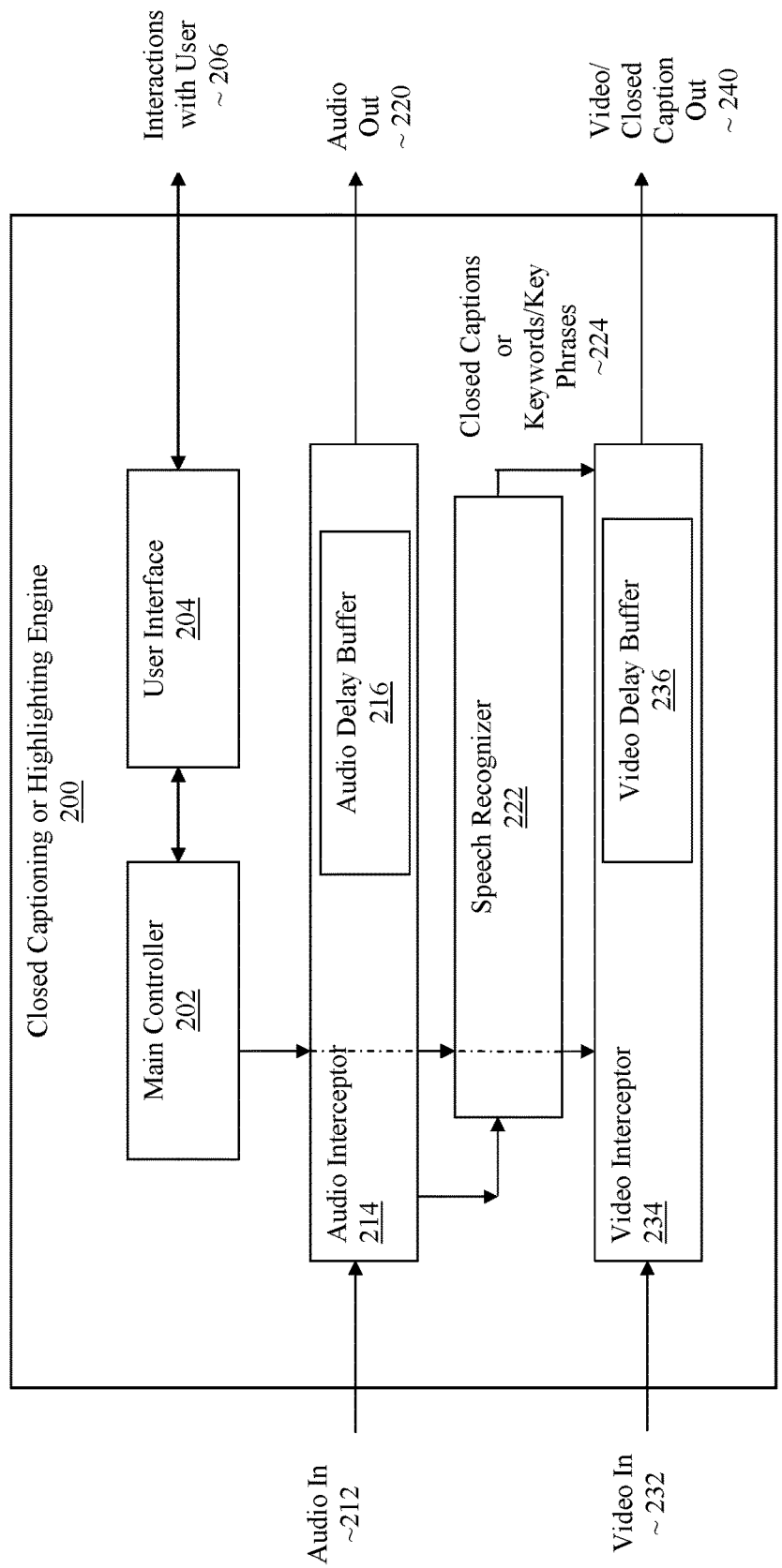
FIG. 2 illustrates a closed captioning or highlighting engine in further detail, in accordance with various embodiments.

Referring now to FIG. 2, wherein a closed captioning or highlighting engine in further detail, in accordance with various embodiments, is shown. As illustrated, closed captioning or highlighting engine 200, which may be closed captioning or highlighting engine 106 of FIG. 1, may include main controller 202, user interface 204, audio interceptor 214, speech recognizer 222 and video interceptor 234, coupled with each other. Audio interceptor 214 and video interceptor 234 may respectively intercept the audio and video portions (Audio In 212 and Video In 214) of an audio/video stream, such as audio/video stream 124 of FIG. 1. In embodiments, audio interceptor 214 and video interceptor 234 may respectively include audio and video delay buffers 216 and 236 to facilitate delay outputs 220 and 240 of the audio and video portions for an amount of time, to provide time for speech in the audio portion be recognized, and closed captions corresponding to the recognized speech and/or keywords/key phrases in the recognized speech be automatically generated to complement the video portion, all in real time.

Speech recognizer 222 may be configured and trained to process the audio portion and recognized speech in one or more languages. Additionally, speech recognizer 222 may be configured to generate closed captions 224 corresponding to the recognized speech and/or keywords/key phrases in the recognized speech, to be incorporated into video output 240. A key phrase may include one or more keywords. A key phrase may also be a key tune. In embodiments, closed captions 224 corresponding to the recognized speech and/or keywords/key phrases in the recognized speech may be first output to an overlay plane, and then later combined together with the video portion by a display controller (not shown). Closed captions 224 may include texts, graphics, symbols, logos, and the like. In embodiments, speech recognizer 222 may cooperate with one or more transliteration engines, e.g., transliteration engines 108 of FIG. 1, to generate closed captions 224 corresponding to the recognized speech and/or keywords/key phrases in the recognized speech, to be incorporated into video output 240, in one or more languages other than the language of the original speech in the audio portion. In embodiments, transliteration engines 108 may be invoked to transliterate detected speech in a first language into a second language. In embodiments, transliteration engines 108 may be invoked to transliterate user inputted key words/key phrase in a first language into a second language to detect the key words/key phrases in the second language.

In embodiments, speech recognizer 222 may be further configured to recognize speakers of the recognized speech, and associate the recognized speech or keywords/key phrases in the recognized speech with their speakers. In other embodiments, identification of the speakers may be provided by applications 104, e.g., in the case of VOIP applications, the originating source/user of an audio/video stream may be known, and may thus be provided to speech recognizer 222 instead.

Main controller 202 may be configured to control the operation of audio and video interceptors 214 and 234, and speech recognizer 222. In particular, main controller 202 may be configured to control the amount of time, if any, audio and/or video interceptors 214 and/or 234 are to respectively delay the audio and/or video to account for an amount of time needed to recognize the speech, and generate the closed captions or keyword/key phrase highlights (including transliteration). In embodiments, main controller 202 may be configured to instruct audio and/or video interceptors 214 and/or 234 to respectively add an amount of time to the scheduled play time of the audio and/or video. In embodiments, main controller 202 may be configured to assume the audio will be muted or on recognition that the audio is muted, instruct only video interceptor 234 to delay the video by an amount of time.

In embodiments, main controller 202 may be further configured to instruct speech recognizer 222 to recognize speech (optionally, including a specification of the input language), and generate closed captioning or keywords/key phrases highlights (optionally, including a specification of the output language). For generation of keywords/key phrases, main controller 202 may be further configured to instruct speech recognizer 222 on the keywords/key phrases to recognize (optionally, including specifications of the speaker or speakers of interest (i.e., on whose speeches keywords/key phrases recognition are to be performed).

In embodiments, main controller 202 may be further configured to instruct video interceptor 234 or alternatively, a display driver (not shown) on the display position, font and size of the closed captions or keyword/key phrase highlights.

In embodiments, closed captioning or highlighting engine 200 may further include user interface 204 configured to facilitate interaction with a user to enable/disable closed captioning or highlighting engine 200, or specify various controls, such as the display position, font and size of the closed captions or keyword/key phrase highlights, to main controller 202. In embodiments, user interface 204 may be further configured to facilitate interaction with an user to specify the keyword/key phrases, and optionally, within whose speeches (i.e., the speakers), to recognize. In embodiments, user interface 204 may be a graphical user interface.

Figure 3:
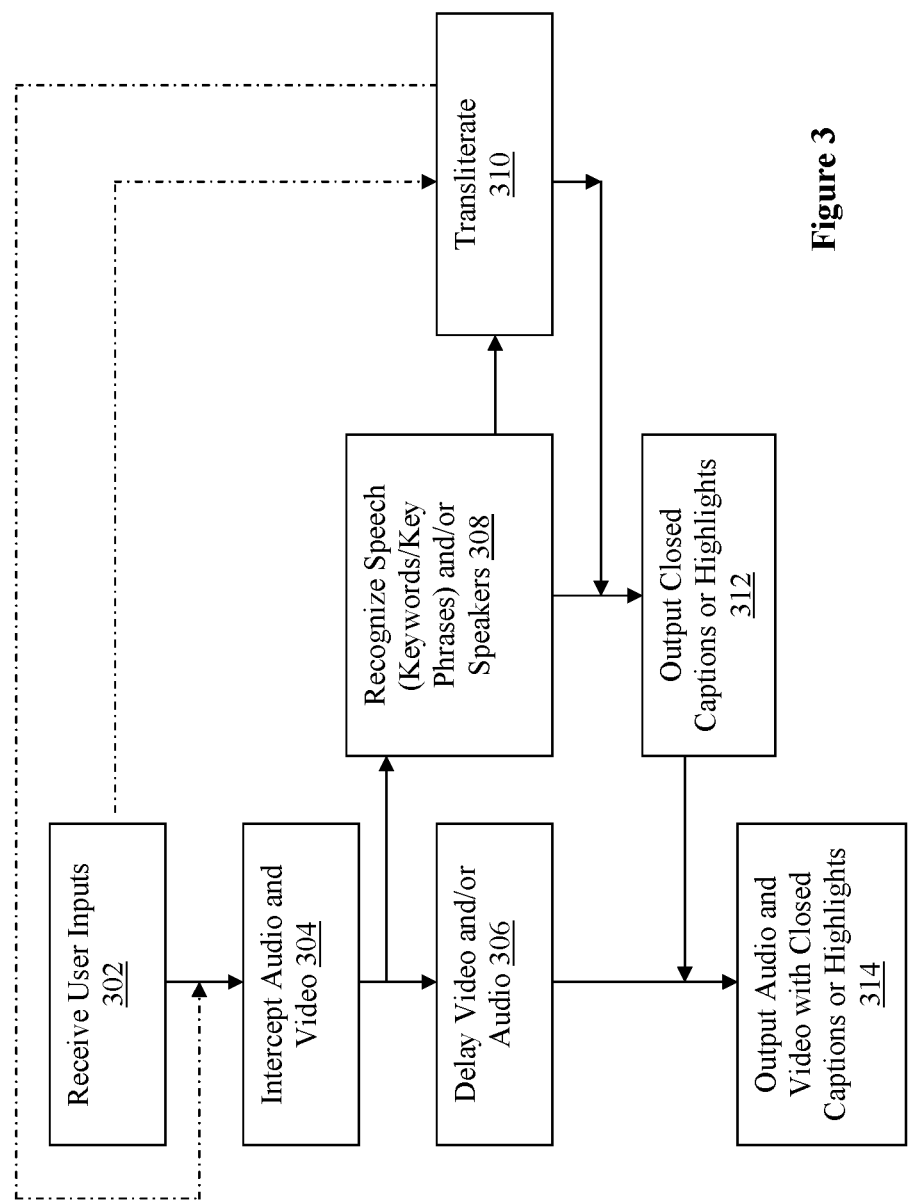
FIG. 3 illustrates a process for providing closed captioning or highlighting, in accordance with various embodiments.

Referring now to FIG. 3, wherein a process for providing closed captioning or highlighting, in accordance with various embodiments, is shown. As shown, process 300 may include the operations in blocks 302-314. The various operations in blocks 302-314 may be performed by closed captioning or highlighting engine 106 or 200 (e.g., by main controller 202, user interface 204, audio and video interceptors 214 and 234, and speech recognizer 222), optionally, in cooperation with transliteration engine 108.

Process 300 may begin at block 302. At block 302, various user inputs may be received, e.g., keywords/key phrases to recognize, speakers on whose speeches keywords/key phrases recognition is to be performed, display position, font and/or size of closed captions and/or keyword/key phrase highlights. Next, at block 304, audio and video portion of an audio/video stream outputted by a multi-media application may be intercepted.

At block 306, the video and/or audio portions of the audio/video stream may be respectively delayed by an amount of time. At block 308, during the delay, speech within the audio portion may be recognized. In particular, keywords and/or key phrases within the recognized speech may be recognized. As described earlier, a key phrase may include one or more words or a key tune. In embodiments, speakers of the recognized speech or keywords/key phrases may be recognized.

Next, process 300 may optionally proceed to block 310. At block 310, the recognized speech or keywords/key phrases in the recognized speech may be transliterated from its original language in the audio portion to one or more other languages.

From either block 308 or block 310, process 300 may proceed to block 312 where the closed captions or keyword/key phrase highlights may be outputted for incorporation into the video portion to complement the video content. As described earlier, the closed captions may include texts, graphics, symbols, logos, and the like.

At block 314, the audio and video, complemented with the automatically generation closed captions or keyword/key phrase highlights may be output and displayed.

In some embodiments, process 300 may also optionally proceed from block 302 to block 304 to invoke the transliteration engine to transliterate user inputs of keywords or key phrases in a first language into a second language (to detect the keywords or key phrases in the second language), and on transliteration, continues at block 304 as earlier described.

Figure 4:
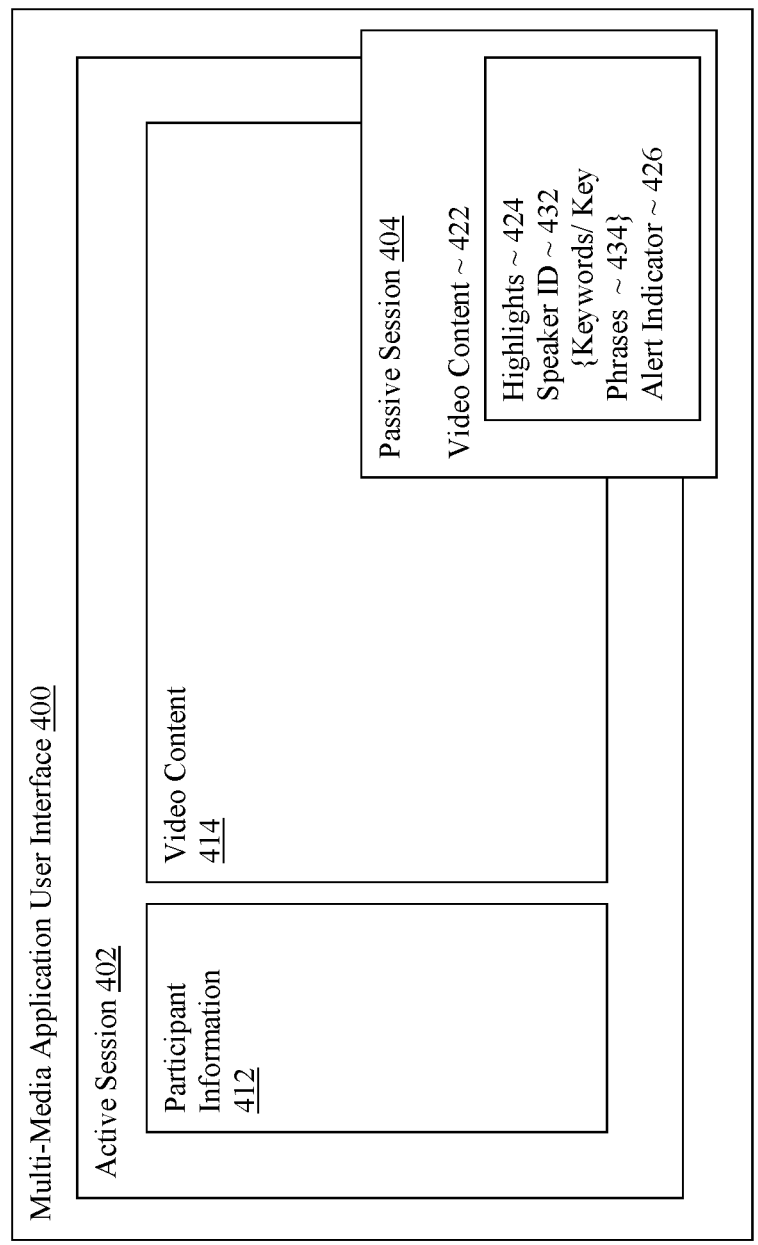
FIG. 4 illustrates an example user interface for providing highlighting to a multi-media application, in accordance with various embodiments.

Referring now to FIG. 4, wherein an example user interface for providing highlighting to a multi-media application, in accordance with various embodiments, is shown. The example user interface 400 may be particularly suitable for multi-media applications, such as online meeting applications, VOIP applications, chat applications and so forth, that support multiple current sessions. As illustrated, in embodiments, multi-media application user interface 400 may include a number of windows 402-404, one for each current application session supported by the multi-media application, regardless whether the application sessions are active or passive (silenced). As illustrated, an active application session may have a larger window 402, showing participant information 412 and video content 414. The audio content of the active application session (not shown) may be concurrently outputted. The passive chat session may have a smaller window 404, e.g., similar to a pop up. Window 404 may include the video content 422, which audio counterpart (not shown) is not outputted. In addition, window 404 may include highlights of the audio content 424, i.e., keywords/key phrases recognized 434. Similar to the closed caption embodiments, a key phrase may include one or more keywords or a key tune; and the highlights may include texts, graphics, symbols, logos and so forth. For the illustrated embodiments, highlights of the audio content 424 may also include speaker identifiers (ID) 422 of the speakers whose speech included the recognized keywords/key phrases 434. Further, in embodiments, window 404, on display of recognized keywords/key phrases 434, may further include alert indicator 426 to draw the user's attention that keywords/key phrases pf interest have been recognized for the silenced passive application session 404. In embodiments, alert indicators 426 may be visual and/or audio.

Thus, a user on notice of recognized keywords/key phrases 434 of interest, may elect to un-silence and return the passive application session 404 to an active state. By virtue of the highlighted keywords and/or key phrases, including optionally, their speakers, a user rejoining an un-silenced application session may be advantageously provided with the context of the application session, potentially allowing the user to re-engage the application session with more ease and/or effectiveness. In embodiments, on return of the passive application session 404 to an active state (which audio content may now be outputted), the previous active application session 402 may be placed into a silenced passive state. In embodiments, a user may also simply dismiss an alert, and maintain passive application session 404 in the silenced passive state.

Figure 5:
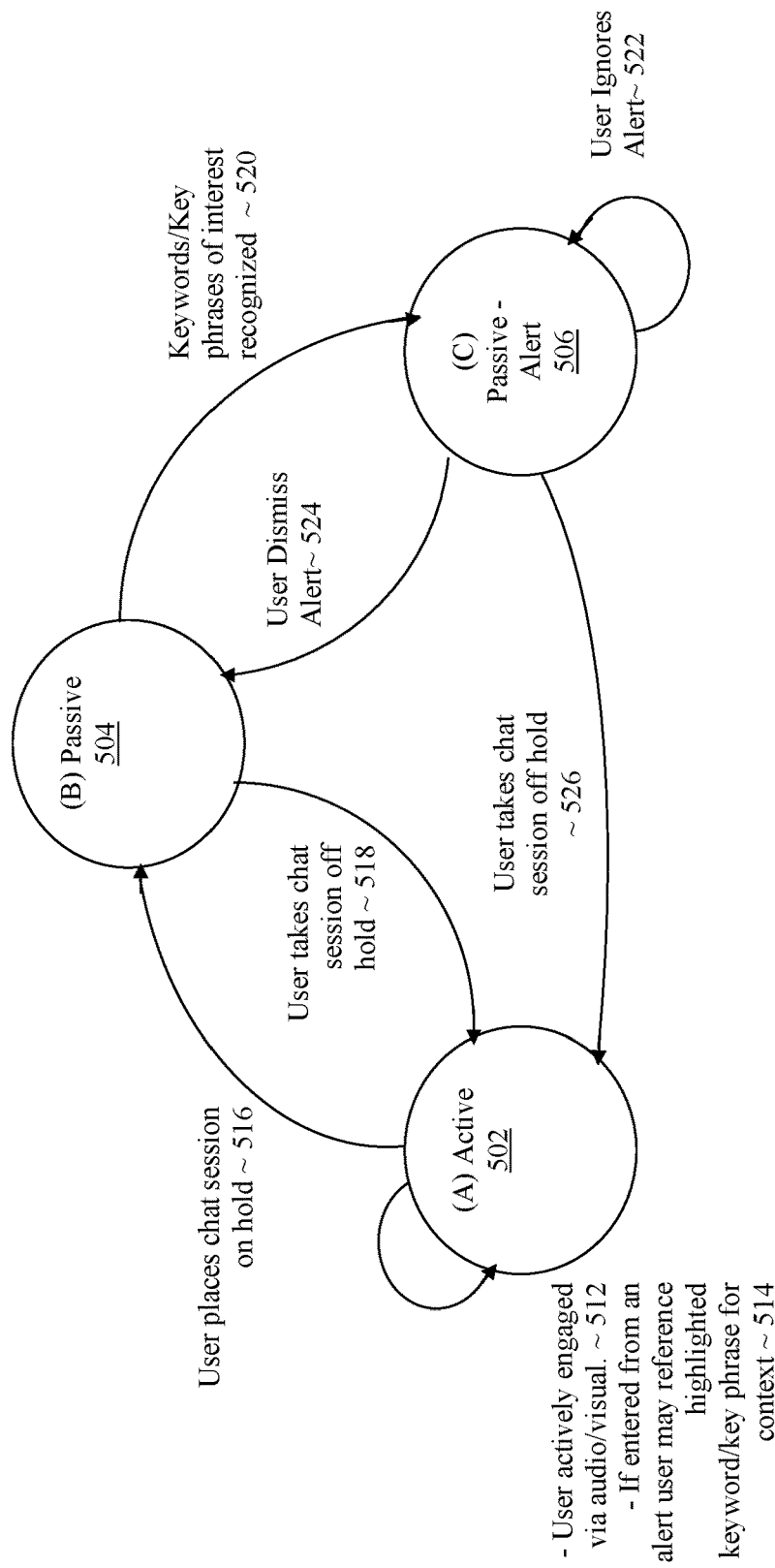
FIG. 5 illustrates the states and state transitions of an application session, in accordance with various embodiments.

Referring now to FIG. 5, wherein the states and state transition of an application session, in accordance with various embodiments, are illustrated. As shown, in embodiments, an application session may be in any one of three states, active state 502, passive state 504 and passive-alert state 506. At active state 502, both the audio and video content are outputted. A user may actively engage with the application session 512, and the application session remains in active state 502. In embodiments, if active state 502 is entered from passive-alert state 506, the user may further reference highlighted keyword/key phrase for context 514.

From active state 502, an application session may transition to passive state 504 if the user places the application session on hold 516. From passive state 504, an application session may transition to active state 502 if the user takes the application session off hold 518.

From passive state 504, an application session may transition to passive-alert state 506 when keywords/key phrases of interest are recognized, and alerts are provided 520. At passive-alert state 506, the application session may remain in the passive-alert state 506, if the user ignores the alert 522. From passive-alert state 506, an application session may transition back to passive state 504 if the user dismisses the alerts 524. From passive-alert state 506, an application session may transition back to active state 502 if the user takes the application session off hold 526. In embodiments, the alert may be dismissed on taking the chat session off hold.

Figure 6:
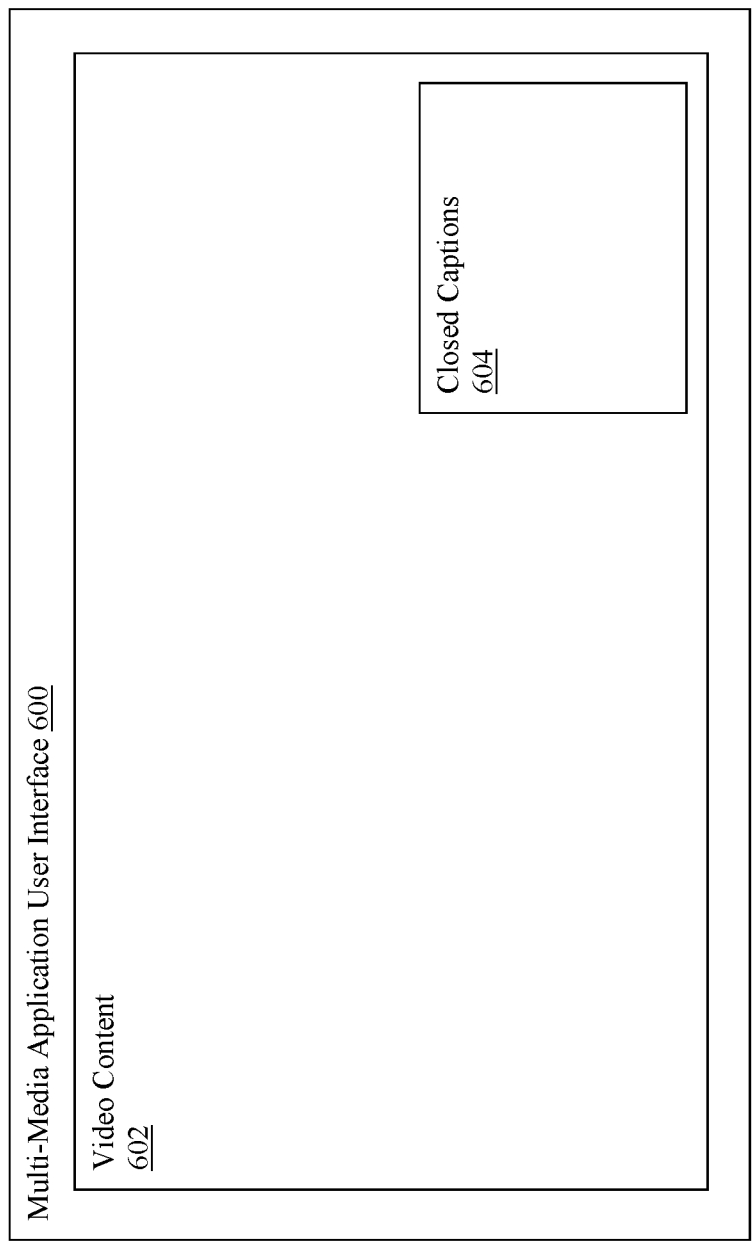
FIG. 6 illustrates another example user interface for providing automatic closed captioning to a multi-media application, in accordance with various embodiments.

Referring to FIG. 6, another example user interface for providing automatic closed captioning to a multi-media application, in accordance with various embodiments, is shown. The example user interface 600 may be particularly suitable for multi-media applications, such as media play applications. As illustrated, multi-media application user interface 600 may include a main window 602, where the video content is shown. In addition, multi-media application user interface 600 may include a secondary window 604, where the automatically generated closed captions may be shown. As described earlier, a key phrase may include one or more keywords or a key tune; and the highlights may include texts, graphics, symbols, logos and so forth. Further, the position and size of secondary window 604 may be specified by the user. Similarly, the language and the font of the closed captions display in secondary window 604 may also be specified by the user.

Figure 7:
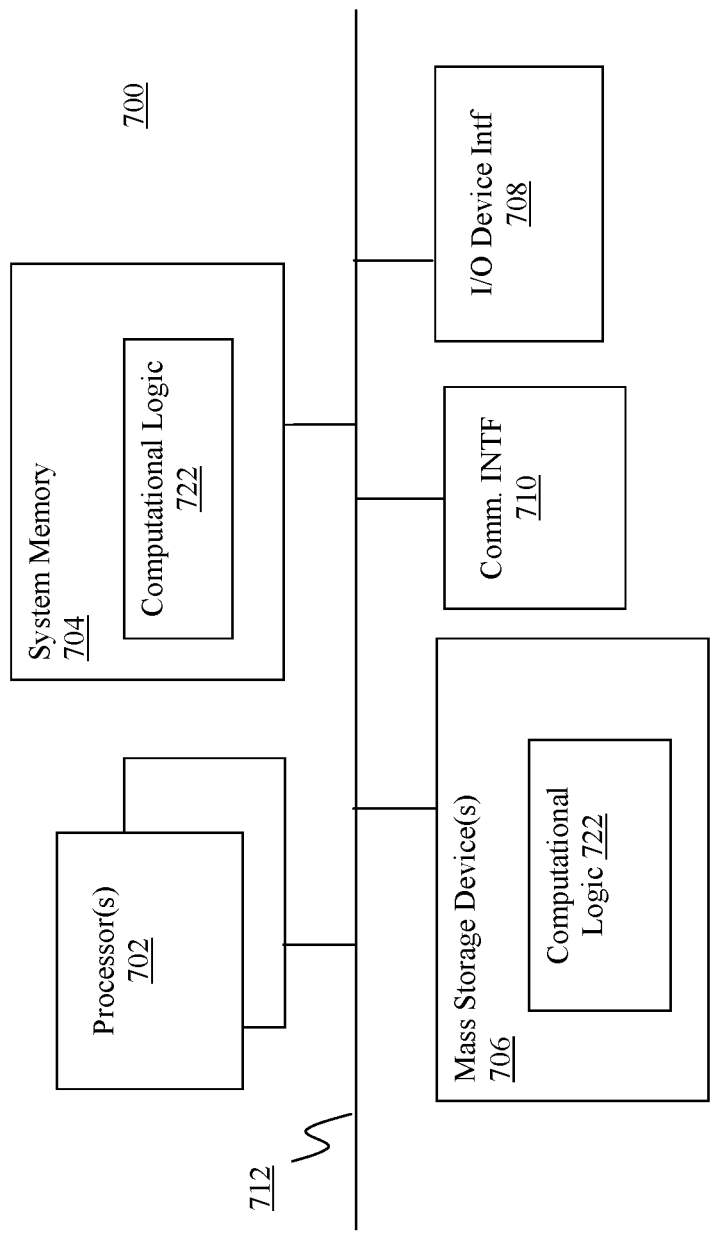
FIG. 7 illustrates a computing system suitable for practicing aspects of the present disclosure, in accordance with various embodiments.

Referring now to FIG. 7, wherein a block diagram of a computer device suitable for practice the present disclosure, in accordance with various embodiments, is illustrated. As shown, computer device 700 may include one or more processors 702 and system memory 704. Each processor 702 may include one or more processor cores. System memory 704 may include any known volatile or non-volatile memory.

Additionally, computer device 700 may include mass storage device(s) 706 (such as solid state drives), input/output device interface 708 (to interface with various input/output devices, such as, mouse, cursor control, display device (including touch sensitive screen), and so forth) and communication interfaces 610 (such as network interface cards, modems and so forth). In embodiments, communication interfaces 710 may support wired or wireless communication, including near field communication. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the executable code of the programming instructions implementing the operations described earlier, e.g., but not limited to, operations associated with main controller 202, user interface 204, audio and video interceptors 214 and 234, speech recognizer 222 and/or transliteration engine 108. The programming instructions may comprise assembler instructions supported by processor(s) 702 or high-level languages, such as, for example, C, that can be compiled into such instructions.

The permanent copy of the executable code of the programming instructions may be placed into permanent mass storage device(s) 706 in the factory, or in the field, through, for example, a distribution medium (not shown), such as a compact disc (CD), or through communication interface 710 (from a distribution server (not shown)).

The number, capability and/or capacity of these elements 710-712 may vary, depending on the intended use of example computer device 700, e.g., whether example computer device 700 is a smartphone, tablet, ultrabook, a laptop, or a vehicle infotainment system. The constitutions of these elements 710-712 are otherwise known, and accordingly will not be further described.

FIG. 8 illustrates an example non-transitory computer-readable storage medium having instructions configured to practice all or selected ones of the operations associated with main controller 202, user interface 204, audio and video interceptors 214 and 234, speech recognizer 222 and/or transliteration engine 108, and so forth, earlier described, in accordance with various embodiments. As illustrated, non-transitory computer-readable storage medium 802 may include the executable code of a number of programming instructions 804. Executable code of programming instructions 804 may be configured to enable a device, e.g., computer device 700, in response to execution of the executable code/programming instructions, to perform, e.g., various operations associated with main controller 202, user interface 204, audio and video interceptors 214 and 234, speech recognizer 222 and/or transliteration engine 108, described with references to FIGS. 1-6. In alternate embodiments, executable code/programming instructions 804 may be disposed on multiple non-transitory computer-readable storage medium 802 instead. In still other embodiments, executable code/programming instructions 804 may be encoded in transitory computer readable medium, such as signals.

Referring back to FIG. 7, for one embodiment, at least one of processors 702 may be packaged together with a computer-readable storage medium having some or all of computing logic 722 (in lieu of storing in system memory 704 and/or mass storage device 706) configured to practice all or selected ones of the operations earlier described with references to FIG. 1-6. For one embodiment, at least one of processors 702 may be packaged together with a computer-readable storage medium having some or all of computing logic 722 to form a System in Package (SiP). For one embodiment, at least one of processors 702 may be integrated on the same die with a computer-readable storage medium having some or all of computing logic 722. For one embodiment, at least one of processors 702 may be packaged together with a computer-readable storage medium having some or all of computing logic 722 to form a System on Chip (SoC). For at least one embodiment, the SoC may be utilized in, e.g., but not limited to, a hybrid computing tablet/laptop.

Example 1 may be an apparatus for providing multi-media content, comprising: an audio interceptor to intercept an audio portion of an audio/video output stream of a multi-media application; a speech recognizer coupled to the audio interceptor to, in real time, process the audio portion of the audio/video stream, recognize speech within the audio portion, and automatically generate text corresponding to recognized speech, or keywords within the recognized speech; and a controller coupled to the audio interceptor and the speech recognizer, to control operations of the audio interceptor and the speech recognizer; wherein the automatically generated text or keywords are to be outputted as closed captions or highlights to complement video content of the audio/video stream.

Example 2 may be example 1, wherein the audio interceptor may further delay the audio portion by an amount of time, wherein to recognize speech, the speech recognizer is to recognize a keyword or a key phrase, and wherein to automatically generate text corresponding to recognized speech, the speech recognizer is to automatically generate text, graphics, symbols or logos corresponding to recognized speech.

Example 3 may be example 1 further comprising a video interceptor to intercept a video portion of the audio/video output stream of the multi-media application.

Example 4 may be example 3, wherein the video interceptor may further delay the video portion by an amount of time.

Example 5 may be example 1, further comprising a transliteration engine to transliterate the automatically generated texts or keywords, or user inputted keywords from a first language to a second language.

Example 6 may be example 5, wherein the speech recognizer may further detect the recognized speech in the first language.

Example 7 may be example 1, wherein the multi-media application may be a media player, and the apparatus further comprises a user interface to receive user inputs on display position, font or size of the closed captions.

Example 8 may be example 1, wherein the multi-media application may be an application that supports multiple current sessions, and the audio/video output stream may be of a silenced session of the application.

Example 9 may be example 8, wherein the speech recognizer may further recognize speakers of the recognized speech.

Example 10 may be example 9, wherein the controller may further cause a speaker identifier to be associated with, and included in a display of the automatically generated keywords.

Example 11 may be example 8, further comprising a user interface to receive user inputs on what keywords and optionally, of which speaker, to be automatically generated on recognition.

Example 12 may be any one of examples 1-11, wherein the audio interceptor, the speech recognizer and the controller are part of a closed captioning or highlighting engine.

Example 13 may be a method for providing multi-media content, comprising: intercepting an audio portion of an audio/video output stream of a multi-media application; in real time, processing the audio portion of the audio/video stream to recognize speech within the audio portion, and to automatically generate text corresponding to recognized speech, or keywords within the recognized speech; and outputting the automatically generated text or keywords as closed captions or highlights to complement video content of the audio/video stream.

Example 14 may be example 13, further comprising delaying the audio portion by an amount of time, wherein processing the audio portion to recognize speech comprises processing the audio portion to recognize a keyword or a key phrase, and wherein to automatically generate text corresponding to recognized speech comprises to automatically generate text, graphics, symbols or logos corresponding to recognized speech.

Example 15 may be example 13 further comprising intercepting a video portion of the audio/video output stream of the multi-media application.

Example 16 may be example 15, further comprising delaying the video portion by an amount of time.

Example 17 may be example 13, further comprising transliterating the automatically generated texts or keywords, or user inputted keywords from a first language to a second language.

Example 18 may be example 17, further comprising detecting the recognized speech is in the first language.

Example 19 may be example 13, wherein the multi-media application may be a media player, and the method may further comprise receiving user inputs on display position, font or size of the closed captions.

Example 20 may be any one of examples 13-18, wherein the multi-media application may be an application that supports multiple current sessions, and the audio/video output stream may be of a silenced session of the application.

Example 21 may be example 20, further comprising recognizing speakers of the recognized speech.

Example 22 may be example 21, further comprising causing a speaker identifier to be associated with, and included in a display of the automatically generated keywords.

Example 23 may be example 20, further comprising receiving user inputs on what keywords and optionally, of which speaker, to be automatically generated on recognition.

Example 24 may be at least one computer readable media (CRM) comprising a plurality of instructions to cause an apparatus, in response to execution of the instructions by the apparatus, to: intercept an audio portion of an audio/video output stream of a multi-media application; in real time, process the audio portion of the audio/video stream, recognize speech within the audio portion, and automatically generate text corresponding to recognized speech, or keywords within the recognized speech; and output the automatically generated text or keywords are as closed captions or highlights to complement video content of the audio/video stream.

Example 25 may be example 24, wherein the apparatus may be further caused to delay the audio portion by an amount of time, wherein to recognize speech comprises to recognize a keyword or a key phrase, and wherein to automatically generate text corresponding to recognized speech comprises to automatically generate text, graphics, symbols or logos corresponding to recognized speech.

Example 26 may be example 24, wherein the apparatus may be further caused to intercept a video portion of the audio/video output stream of the multi-media application.

Example 27 may be example 26, wherein the apparatus may be further caused to delay the video portion by an amount of time.

Example 28 may be example 24, wherein the apparatus may be further caused to transliterate the automatically generated texts or keywords, or user inputted keywords from a first language to a second language.

Example 29 may be example 28, wherein the apparatus may be further caused to detect the recognized speech in the first language.

Example 30 may be example 24, wherein the multi-media application may be a media player, and wherein the apparatus may be further caused to receive user inputs on display position, font or size of the closed captions.

Example 31 may be any one of examples 24-29, wherein the multi-media application may be an application that supports multiple current sessions, and the audio/video output stream is of a silenced session of the application.

Example 32 may be example 31, wherein the apparatus may be further caused to recognize speakers of the recognized speech.

Example 33 may be example 32, wherein the apparatus may be further caused to cause a speaker identifier to be associated with, and included in a display of the automatically generated keywords.

Example 34 may be example 31, wherein the apparatus may be further caused to receive user inputs on what keywords and optionally, of which speaker, to be automatically generated on recognition.

Example 35 may be an apparatus for providing multi-media content, comprising: means for intercepting an audio portion of an audio/video output stream of a multi-media application; means for processing, in real time, the audio portion of the audio/video stream to recognize speech within the audio portion, and to automatically generate text corresponding to recognized speech, or keywords within the recognized speech; and means for outputting the automatically generated text or keywords as closed captions or highlights to complement video content of the audio/video stream.

Example 36 may be example 35, further comprising means for delaying the audio portion by an amount of time, wherein means for processing, in real time, the audio portion to recognize speech comprises means for processing, in real time, the audio portion to recognize a keyword or a key phrase, and wherein to automatically generate text corresponding to recognized speech comprises to automatically generate text, graphics, symbols or logos corresponding to recognized speech.

Example 37 may be example 35 further comprising means for intercepting a video portion of the audio/video output stream of the multi-media application.

Example 38 may be example 37, further comprising means for delaying the video portion by an amount of time.

Example 39 may be example 35, further comprising means for transliterating the automatically generated texts or keywords, or user inputted keywords from a first language to a second language.

Example 40 may be example 39, further comprising means for detecting the recognized speech is in the first language.

Example 41 may be example 35, wherein the multi-media application may be a media player, and the apparatus may further comprise means for receiving user inputs on display position, font or size of the closed captions.

Example 41 may be any one of examples 35-40, wherein the multi-media application may be an application that supports multiple current sessions, and the audio/video output stream may be of a silenced session of the application.

Example 43 may be example 42, further comprising means for recognizing speakers of the recognized speech.

Example 44 may be example 43, further comprising means for causing a speaker identifier to be associated with, and included in a display of the automatically generated keywords.

Example 45 may be example 42, further comprising means for receiving user inputs on what keywords and optionally, of which speaker, to be automatically generated on recognition.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for providing multi-media content, comprising:
an audio interceptor to intercept at the apparatus a first audio portion of a first audio/video output stream of a passive multi-party online meeting session of a multi-media online meeting application of the apparatus, the multi-media online meeting concurrently facilitating at least an active multi-party online meeting session and the passive multi-party online meeting session for a user participant of the multi-party online meeting sessions, wherein the first audio portion of the first audio/video output stream of the passive multi-party online meeting session is not being audibly outputted by the multi-media online meeting application for the user participant of the multi-party online meeting sessions, and a second audio portion of a second audio/video output stream of the active multi-party online meeting session is being audibly outputted by the multi-media online meeting application for the user participant of the multi-party online meeting sessions, and wherein the active and passive multi-party online meetings comprise different first and second pluralities of remote meeting participants located at different first and second pluralities of locations, and the first and second audio/video output streams comprise different audio and video inputs from the different first and second pluralities of remote meeting participants at the different first and second pluralities of locations;
a speech recognizer coupled to the audio interceptor to, in real time, at the apparatus, process the first audio portion of the audio/video stream, recognize speech within the first audio portion, and automatically generate text corresponding to recognized speech, or keywords within the recognized speech of one or more of the first plurality of remote meeting participants according to specifications of the user participant; and
a controller coupled to the audio interceptor and the speech recognizer, to control operations of the audio interceptor and the speech recognizer;

wherein the automatically generated text or keywords are to be outputted as closed captions or highlights, along with an alert to alert the user participant, to complement a first video content of the first audio/video stream of the passive multi-party online meeting session outputted at the apparatus, the first video content of the first audio/video stream being visually outputted, at the apparatus, concurrently with audio and visual output of a second video content of the second audio/video stream of the active multi-party online meeting session, at the apparatus, for the user participant of the multi-party online meeting sessions; and wherein on output of the automatically generated text or keywords, along with the alert, the passive multi-party online meeting session is transitioned to a passive-alert multi-party online meeting session.

2. The apparatus of claim 1, wherein the audio interceptor is to further delay the first audio portion of the first audio/video output stream of the passive session by an amount of time; wherein to recognize speech, the speech recognizer is to recognize a keyword or a key phrase, and wherein to automatically generate text corresponding to recognized speech, the speech recognizer is to automatically generate text, graphics, symbols or logos corresponding to recognized speech.

3. The apparatus of claim 1, further comprising a video interceptor to intercept the first video portion of the first audio/video output stream of the passive session of the multi-media application.

4. The apparatus of claim 3, wherein the video interceptor is to further delay the first video portion of the first audio/video output stream of the passive session by an amount of time.

5. The apparatus of claim 1, further comprising a transliteration engine to transliterate the automatically generated texts or keywords, or user inputted keywords from a first language to a second language.

6. The apparatus of claim 5, wherein the speech recognizer is to further detect the recognized speech in the first language.

7. The apparatus of claim 1, wherein the multi-media application is a media player, and the apparatus further comprises a user interface to receive user inputs on display position, font or size of the closed captions.

8. The apparatus of claim 1, wherein in response to an inaction of the user participant, a passive-alert multi-party chat session remains as a passive-alert multi-party chat session, or in response to an action of the user participant, a passive-alert multi-party chat session becomes an active multi-party chat session or reverts back to the passive multi-party chat session.

9. The apparatus of claim 1, wherein the speech recognizer is to further recognize speakers of the recognized speech.

10. The apparatus of claim 9, wherein the controller is to further cause a speaker identifier to be associated with, and included in, a display of the automatically generated keywords.

11. The apparatus of claim 1, further comprising a user interface to receive user inputs on what keywords and optionally, of which speaker, are to be automatically generated on recognition for the first audio portion of the first audio/video output stream of the passive session.

12. The apparatus of claim 1, wherein the audio interceptor, the speech recognizer and the controller are part of a closed captioning or highlighting engine of the multi-media application.

13. A method for providing multi-media content, comprising:

intercepting, at a computing device, a first audio portion of a first audio/video output stream of a passive multi-party online meeting session of a multi-media application of the computing device, concurrently facilitating at least an active multi-party online meeting session and the passive multi-party online meeting session for a user participant of the multi-party online meeting sessions, wherein the first audio portion of the first audio/video output stream of the passive multi-party online meeting session is not being audibly outputted for the user participant of the multi-party online meeting sessions, and a second audio portion of a second audio/video output stream of the active multi-party online meeting session is being audibly outputted for the user participant of the multi-party online meeting sessions, and wherein the active and passive multi-party online meeting sessions comprise different first and second pluralities of remote parties located at different first and second pluralities of locations, and the first and second audio/video output streams comprise different audio inputs from the different first and second pluralities of remote parties at the different first and second pluralities of locations;

in real time, processing, at the computing device, the first audio portion of the first audio/video stream to recognize speech within the audio portion, and to automatically generate text corresponding to recognized speech, or keywords within the recognized speech of one or more of a plurality of remote meeting participants according to specifications of the user participant;

outputting, at the computing device, the automatically generated text or keywords as closed captions or highlights, along with an alert to alert the user participant, to complement a first video content of the first audio/video stream of the passive multi-party online meeting session, the first video content of the first audio/video stream being visually outputted, at the computing device, concurrently with audio and visual outputs of a second video content of the second audio/video stream of the active multi-party online meeting session for the user participant of the multi-party online meeting sessions; and transitioning the passive multi-party online meeting session to a passive-alert multi-party online meeting session.

14. The method of claim 13, further comprising delaying, at the computing device, the first audio portion of the first audio/video output stream of the passive session by an amount of time; wherein processing the audio portion to recognize speech comprises processing the first audio portion of the first audio/video output stream of the passive session to recognize a keyword or a key phrase, and wherein to automatically generate text corresponding to recognized speech comprises to automatically generate text, graphics, symbols or logos corresponding to recognized speech.

15. The method of claim 13, further comprising intercepting, at the computing device, a first video portion of the first audio/video output stream of the passive session of the multi-media application, and delaying, at the computing device, the first video portion of the first audio/video output stream of the passive session of the multi-media application by an amount of time.

16. The method of claim 13, further comprising: in response to an inaction of the user participant, keeping a passive-alert multi-party chat session as a passive-alert multi-party chat session, or in response to an action of the user participant, transitioning the passive-alert multi-party chat session to become an active multi-party chat session or to revert back to the passive multi-party chat session.

17. The method of claim 13, further comprising transliterating, at the computing device, the automatically generated texts or keywords, or user inputted keywords from a first language to a second language.

18. At least one non-transitory computer readable media (CRM) comprising a plurality of instructions to cause an apparatus, in response to execution of the instructions by the apparatus, to:
- intercept, at the apparatus, a first audio portion of a first audio/video output stream of a passive multi-party online meeting session of a multi-media application of the apparatus, currently facilitating at least an active multi-party online meeting session and the passive multi-party online meeting session for a user participant of the multi-party online meeting sessions, wherein the first audio portion of the first audio/video output stream of the passive multi-party online meeting session is not being audibly outputted for the user participant of the multi-party online meeting sessions, and a second audio portion of a second audio/video output stream of the active multi-party online meeting session is being audibly outputted for the user participant of the multi-party online meeting sessions, wherein the active and passive multi-party online meeting sessions comprise different first and second pluralities of remote parties located at different first and second pluralities of locations, and the first and second audio/video output streams comprise different audio inputs from the different first and second pluralities of remote parties at the different first and second pluralities of locations;
- in real time, process, at the apparatus, the first audio portion of the first audio/video stream, recognize speech within the audio portion, and automatically generate text corresponding to recognized speech, or keywords within the recognized speech of one or more of a first plurality of remote meeting participants according to specifications of the user participant;
- output, at the apparatus, the automatically generated text or keywords as closed captions or highlights, along with an alert to alert the user participant, to complement a first video content of the first audio/video stream of the passive multi-party online meeting session, the first video content of the first audio/video stream being visually outputted, at the apparatus, concurrently with visual output of a second video content of the second audio/video stream of the active multi-party online meeting session for the user participant of the multi-party online meeting sessions; and
- transition the passive multi-party online meeting session to a passive-alert multi-party online meeting session.

19. The non-transitory CRM of claim 18, wherein the apparatus is further caused to recognize speakers of the recognized speech.

20. The non-transitory CRM of claim 19, wherein the apparatus is further caused to cause a speaker identifier to be associated with, and included in, a display of the automatically generated keywords.

21. The non-transitory CRM of claim 18, wherein the apparatus is further caused to receive user inputs on what keywords and optionally, of which speaker, are to be automatically generated on recognition for the first audio portion of the first audio/video output stream of the passive session.

22. The CRM of claim 18, wherein the apparatus is further caused to respond to inaction of the user participant, by keeping a passive-alert multi-party chat session as a passive-alert multi-party chat session, or respond to an action of the user participant, and transition the passive-alert multi-party chat session to become an active multi-party chat session or to revert back to the passive multi-party chat session.

* * * * *